Patented June 11, 1940

2,204,223

UNITED STATES PATENT OFFICE 2,204,223

METHOD OF TREATING OIL AND GAS WELLS

Howard C. Lawton and Albert G. Loomis, Berkeley, Calif., assignors to Shell Development Company, San Francisco, Calif., a corporation of Delaware No Drawing. Application January 30, 1939, Serial No. 253,604

5 Claims. (Cl. 166—21)

This invention pertains to the treatment of oil and gas wells and is more specifically concerned with an improved method for soldifying untable formations and selectively sealing off water and gas formations traversed by wells.

It is well known that compounds which hydrolyze in the presence of water to form insoluble substances may be used to plug water-bearing strata traversed by oil wells. Compounds that can be used for this purpose are, for example, silicon tetrachloride, silicon esters, such as described in the co-pending application Serial No. 99,943, filed September 9, 1936, and anhydrous solutions of metal alcoholates, such as described in the co-pending application Serial No. 174,654, filed November 15, 1937, now Patent No. 2,169,458 granted August 15, 1939.

It is also known that oil bearing strata which are often adjacent water bearing layers contain small amounts of connate water and in many cases this amount of water is sufficient to hydrolyze at least part of the above compounds on their introduction into these strata with the undesirable result of a plugging action within the oil-bearing formations.

It is, therefore, an object of this invention to provide a method for selectively plugging water-bearing strata wherein oil-bearing strata are first freed of connate water by treatment of the well with an oil-soluble liquid capable of dissolving and removing said water, and the water-bearing strata are then plugged by introducing into the formation compounds capable of forming therein insoluble substances by reaction with water.

It is a further object of this invention to provide for the above treatment suitable oil-soluble treating liquids containing wetting agents capable of reducing the surface tension of water, whereby a more effective removal of connate water from oil bearing strata is obtained.

It is another object of this invention to provide a method for increasing the permeability of oil-producing layers through the removal of connate water from these layers by means of suitable treating liquids.

The liquids which may be used to carry out the process of this invention are those in which both oil and water are highly soluble, for example, ketones such as acetone, methyl ethyl ketone, methyl propyl ketone, diethyl ketone, etc.; alcohols such as n-propyl alcohol, isopropyl alcohol, n-butyl alcohol, secondary-butyl alcohol, etc.; ethers, particularly cyclic ethers such as dioxane, tetramethylene oxide, furan, etc.; ether alcohols such as methyl cellosolve, cellosolve, isopropyl cellosolve, the carbitols, etc.; esters such as butyl lacetate, glycol diacetate, carbitol acetates, or cellosolve acetates. Pyridine and/or mixtures of pyridine, nitrogen bases, and Edeleanu extract from kerosene with the above solvents may likewise be used. For example, especially favorable results have been obtained with the following mixtures:

|  |  | Per cent |
|---|---|---|
| a. | Methyl propyl ketone | 18 |
|  | Acetone | 37 |
|  | Nitrogen bases | 45 |
| b. | Nitrogen bases | 40 |
|  | Acetone tops | 30 |
|  | Edeleanu extract | 30 |
| c. | Methyl ethyl ketone | 50 |
|  | Methyl isobutyl ketone | 50 |

Wetting agents which may be added to said treating liquids for the purpose of more effective water removal may be amines such as trimethylamine or triethanol amine, esters such as naphthalene sulphonic acid ester, oleic acid sulphate, oleo glyceryl sulphate, sulphonated oils, such as sulphonated castor oil, or alkyl sulphates such as those commercially known as the Gardinols. The addition of approximately 1% of a wetting agent will suffice for the purpose of this invention.

Briefly, the invention resides in introducing into the formation traversed by a well an oil-soluble treating solution capable of dissolving the water, causing said treating solution to dissolve the water in both the oil and the water layers, withdrawing the treating solution from the formation and from the well, allowing the water removed from the oil-bearing layer to become replaced with oil from more remote reaches of the oil-bearing layer, allowing the water removed from the water-bearing layer to become replaced with water from more remote reaches of the water-bearing layer, and then introducing into the well and forcing into the formation a sealing agent capable of forming insoluble compounds by reaction with water, whereby a sealing precipitate is caused to form only within the water-bearing layer, thus effectively plugging said layer.

In a preferred embodiment, the treating liquid, comprising a water and oil-miscible solvent, is introduced into the well and driven into both the oil and water strata by application of pressure achieved by any well known means such as an overburden of oil or water, or gas or air pressure. For example, the treating liquid may be methyl ethyl ketone to which there may or may not be added a wetting agent such as one of those mentioned above. It is well known that water in the oil-bearing strata is held in the smaller capillary spaces by virtue of its high surface tension and therefore, normally cannot be withdrawn with the oil. By introducing a treating solution to dissolve the water and to lower the interfacial tension between water and oil and withdrawing the resulting liquid from the oil-bearing strata, the water is released from the capillary spaces and removed from the well with the treating liquid. These capillary spaces are then available for the flow of oil, and as it is known that the rate of production obtained in an oil well is highly dependent on the permeability of the formation in the immediate vicinity of the well, the clearing of the capillary spaces of bound water to permit a flow of oil through them, represents an increase in permeability and, hence, an increase in the rate of production. Of course, the treatment does not affect water-bearing strata as water withdrawn therefrom with the treating fluid is replaced by further flow of water from more remote portions of the water-bearing layer. Hence, after the treating solution has been forced into the formation and has dissolved, become associated with, or released the water in the oil-bearing strata, the well is bailed out, if necessary, and "brought into production" as the process of withdrawing liquids from a well is commonly called in oil-well drilling practice. The oil-bearing strata now being water-free, the desired water shut-off chemical, for example, ethyl silicate, is then forced into both the oil and water strata by means of pressure. The chemical reacts in water-bearing strata with the water to form a plugging material, but cannot react in oil formations because the water had been previously removed by the treating liquid. Water shut-off compounds which form insoluble substances upon reaction with salts normally present in ground waters may also be applied to the present process, although compounds reacting with water are preferable due to the formation of a greater amount of precipitate.

It is apparent that by the method herein described not only can a high degree of selectivity be obtained in plugging water strata, but the permeability of the oil-producing layers can also be increased at the same time. The combination of these effects, that is, shutting off water on the one hand, and increasing the oil production on the other, is highly desirable in the art of economical and conservative oil production.

The examples shown herein are not intended to limit the scope, but rather to illustrate the broad aspects of this invention. It is to be understood that combinations of other solvents and other sealing agents than those given hereinabove may be equally effective and may be employed without departing from the spirit of the present invention.

We claim as our invention:

1. In the process of selectively sealing off a formation traversed by a well, said formation comprising water-bearing layers adjacent oil-bearing layers holding relatively small quantities of connate water, the steps of introducing into the well and forcing into the formation an inert non-aqueous solvent miscible with water and oil, allowing said solvent to dissolve the formation waters, withdrawing the solvent and the waters dissolved therein from the formation and the well, whereby the water removed with the solvent is caused to be replaced with water in the water-bearing layers and with oil in the oil-bearing layers, and introducing into the well and forcing into the formation a sealing agent forming oil and water insoluble compounds by hydrolysis, whereby a sealing precipitate is caused to form within the water-bearing layer.

2. In the process of selectively sealing off a formation traversed by a well, said formation comprising water-bearing layers adjacent oil-bearing layers holding relatively small quantities of connate water, the steps of introducing into the well and forcing into the formation an inert non-aqueous solvent miscible with water and oil, said solvent containing a small amount of a surface-tension reducing agent, allowing said solvent to dissolve the formation waters, withdrawing the solvent and the waters dissolved therein from the formation and the well, whereby the water removed with the solvent is caused to be replaced with water in the water-bearing layers and with oil in the oil bearing layers, and introducing into the well and forcing into the formation a sealing agent forming oil and water insoluble compounds by hydrolysis, whereby a sealing precipitate is caused to form within the water-bearing layer.

3. In the process of selectively sealing off a formation traversed by a well, said formation comprising water-bearing layers adjacent oil-bearing layers holding relatively small quantities of connate water, the steps of introducing into the well and forcing into the formation an inert non-aqueous solvent miscible with water and oil, said solvent containing a heterocyclic nitrogen base compound, allowing said solvent to dissolve the formation waters, withdrawing the solvent and the waters dissolved therein from the formation and the well, whereby the water removed with the solvent is caused to be replaced with water in the water-bearing layers and with oil in the oil-bearing layers, and introducing into the well, and forcing into the formation a sealing agent forming oil and water insoluble compounds by reaction with water, whereby a sealing precipitate is caused to form within the water-bearing layer.

4. In the process of selectively sealing off a formation traversed by a well, said formation comprising water-bearing layers adjacent oil-bearing layers holding relatively small quantities of connate water, the steps of introducing into the well and forcing into the formation an inert non-aqueous solvent miscible with water and oil, said solvent containing nitrogen bases, allowing said solvent to dissolve the formation waters, withdrawing the solvent and the waters dissolved therein from the formation and the well, whereby the water removed with the solvent is caused to be replaced with water in the water-bearing layers and with oil in the oil-bearing layers, and introducing into the well and forcing into the formation a sealing agent forming oil and water insoluble compounds by reaction with water, whereby a sealing precipitate is caused to form within the water-bearing layer.

5. In the process of selectively sealing off a formation traversed by a well, said formation comprising water-bearing layers adjacent oil-bearing layers holding relatively small quantities of connate water, the steps of introducing into the well and forcing into the formation an inert non-aqueous solvent miscible with water and oil, said solvent containing pyridine, allowing said solvent to dissolve the formation waters, withdrawing the solvent and the waters dissolved therein from the formation and the well, whereby the water removed with the solvent is caused to be replaced with water in the water-bearing layers and with oil in the oil-bearing layers, and introducing into the well, and forcing into the formation a sealing agent forming oil and water insoluble compounds by reaction with water, whereby a sealing precipitate is caused to form within the water-bearing layer.

HOWARD C. LAWTON.
ALBERT G. LOOMIS.

DISCLAIMER 2,204,223.—*Howard C. Lawton* and *Albert G. Loomis*, Berkeley, Calif. METHOD OF TREATING OIL AND GAS WELLS. Patent dated June 11, 1940. Disclaimer filed February 4, 1941, by the assignee, *Shell Development Company*.
Hereby enters this disclaimer to claim 1 in said specification.
[*Official Gazette March 11, 1941.*]

DISCLAIMER 2,204,223.—*Howard C. Lawton* and *Albert G. Loomis*, Berkeley, Calif. METHOD OF TREATING OIL AND GAS WELLS. Patent dated June 11, 1940. Disclaimer filed February 4, 1941, by the assignee, *Shell Development Company*.

Hereby enters this disclaimer to claim 1 in said specification.

[*Official Gazette March 11, 1941.*]